R. E. DUNHAM & A. E. MERKEL.
COMBINED SCRAPER AND HANDLE LOCK FOR LAWN ROLLERS.
APPLICATION FILED SEPT. 24, 1917.
1,287,264.
Patented Dec. 10, 1918.
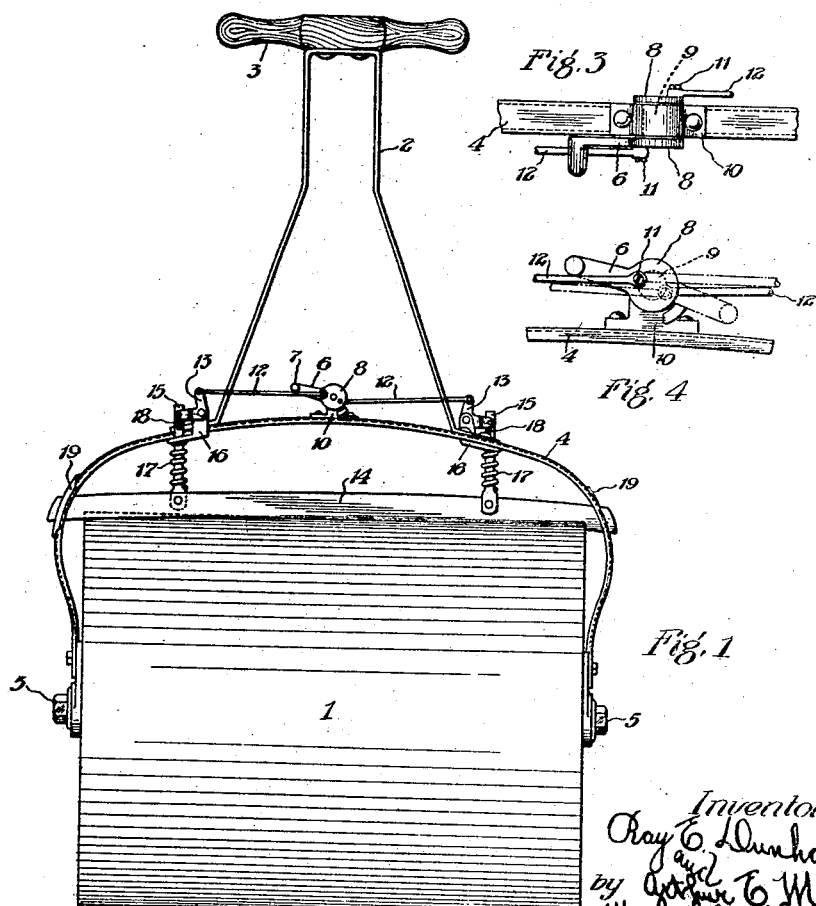

UNITED STATES PATENT OFFICE.

RAY E. DUNHAM, OF BEREA, AND ARTHUR E. MERKEL, OF CLEVELAND, OHIO, ASSIGNORS TO THE DUNHAM COMPANY, OF BEREA, OHIO, A CORPORATION OF OHIO.

COMBINED SCRAPER AND HANDLE-LOCK FOR LAWN-ROLLERS.

1,287,264.                    Specification of Letters Patent.     Patented Dec. 10, 1918.

Original application filed June 6, 1917, Serial No. 173,161. Divided and this application filed September 24, 1917. Serial No. 192,991.

*To all whom it may concern:*

Be it known that we, RAY E. DUNHAM and ARTHUR E. MERKEL, citizens of the United States, and residents, respectively, of Berea, county of Cuyahoga, and State of Ohio, and Cleveland, county of Cuyahoga, and State of Ohio, have invented new and useful Improvements in Combined Scrapers and Handle-Locks for Lawn-Rollers, of which the following is a specification, the principle of the invention being herein explained and the best mode in which we have contemplated applying that principle, so as to distinguish it from other inventions.

Our invention relates to land rollers and particularly to that class of such rollers which are water-weight rollers and particularly used for rolling lawns, the object of the invention being to provide a lawn roller with means for scraping or cleaning the cylindrical surface of the drum. These means may incidentally be so disposed as to form a lock for the handle and are so disposed in the embodiment of our invention herein shown and described. More particularly, our invention relates to improvements in this class of rollers whereby the scraping means are disposed in a plane intersecting the drum's axis so that the scraping function is effected by means of a shearing action rather than by flat contact. Furthermore, our invention relates to specific means for mounting the scraper bar by a double support.

The said invention is an improvement upon the combined scrapers and handle locks for lawn rollers described and claimed in U. S. Letters Patent No. 1,218,635, issued to R. E. Dunham, one of the applicants herein, and has been divided out of pending application for U. S. Letters Patent, Serial No. 173,161, filed by these applicants June 6, 1917.

Our improvements consist in providing such combined scrapers and handle locks for lawn rollers with means whereby the scraper bar may be resiliently locked to the surface of the drum so as to provide a lock for the handle, when the roller is not in use, and yet may accommodate itself to any uneven condition of the soil, when the roller is in use and may further be positively locked out of contact with the drum surface, when the device is being used as a roller alone.

The annexed drawing and the following description set forth in detail certain means embodying our invention, the disclosed means, however, constituting but one of various mechanical forms in which the principle of the invention may be employed.

In said annexed drawing:

Figure 1 represents a front elevation of our improved lawn roller; Fig. 2 represents a plan view of the parts shown in Fig. 1; and Figs. 3 and 4 represent, respectively, upon an enlarged scale, a plan view and a front elevation of the eccentric and connected parts shown in Fig. 1.

Referring to the annexed drawing, our improved roller comprises a drum 1 upon which is oscillatorily mounted a handle provided with a handle portion proper 2, a grip portion 3 and a transverse member 4, the axle upon which the handle is thus mounted not being shown, the mounting being by means of roller bearings (not shown), the same being retained and protected by the hub caps 5. Mounted upon the transverse member 4 is a supporting bearing member 10 and journaled in said member 10 by means of a connecting journal portion 9 are two disks 8 forming an eccentric member 6. Eccentrically connected by pins 11 to said disks 8, respectively, are a pair of rods 12 extending in opposite directions and connected at their other ends, respectively, to a pair of bell-crank levers 13, the other ends of which levers are in turn connected to the upper ends, respectively, of upright rods 15, forming supports for a scraper bar 14, as plainly shown in Fig. 1. Said scraper bar 14 extends generally longitudinally across substantially the whole surface of the drum 1, and is mounted at an angle to the drum's axis. This angular mounting is effected by means of members 16 which are connected to the under surface of the transverse member 4, which support the links 13 and are provided with holes through which the rods 15 project, and are carried upon opposite sides of the transverse member 4. It will be apparent that the action of the scraper bar 14, which in this form of device lies in the periphery of an ellipse, will be a shearing one.

Springs 17 normally hold the scraper bar 14 against the surface of the drum 1 but when any uneven condition of soil is encountered, the scraper bar 14, against the action of the springs 17, is moved upwardly by reason of the fact that in the upper ends of the rods 15 are provided elongated slots 18 within which the ends of the links 13 are secured and may move, relatively, as plainly shown in Fig. 1. It is apparent from an inspection of the full line and dotted line positions in Fig. 4 of the eccentric 6, that the rotation of the disks 8 to one extreme position will effect the movement of the scraper bar 14 entirely out of engagement with the drum surface, so that the roller can be used as a roller alone, and that the movement of the disks 8 to their other extreme position, will effect the engagement of the scraper bar 14 with the drum's surface, so that said bar may form a lock for the handle, when the roller is not in use and, when the roller is in use, this lock will be a resiliently retained one which will be constantly disturbed by the adjustment of the scraper to the drum's surface.

What we claim is:

1. In a land roller, the combination of a drum and a handle therefor; a scraper bar supported by said handle and adapted to be moved into and out of the vicinity of the drum, said bar being arranged at an angle to the planes containing the axis of the drum; and means for effecting the movement of said bar.

2. In a land roller, the combination of a drum and a handle therefor, a manually-operable eccentric mounted upon said handle; and a scraper bar supported by said handle and arranged by the actuation of the eccentric to be moved into and out of the vicinity of the drum, said scraper bar being arranged at an angle to the planes containing the axis of the drum.

3. In a land roller, the combination of a drum; an oscillatory handle mounted upon the latter; a manually-operable eccentric mounted upon said handle; and a scraper bar supported by said handle and arranged by the actuation of the eccentric to be moved to engage or disengage the surface of the drum whereby said scraper bar may be caused to form a lock for the said handle, said scraper bar being arranged at an angle to the planes containing the axis of said drum.

4. In a land roller, the combination of a drum and a handle therefor including a tranverse member; a pair of manually-operable rotatably connected disks mounted upon said transverse member; a pair of links eccentrically connected at one end to said disks, respectively, and extending in opposite directions; a pair of rods; a pair of angle arms mounted upon said transverse member and connecting the other ends of said links and said rods, respectively, the latter being adapted to be reciprocated in guides formed in said transverse member; and a scraper bar disposed at an angle to the planes containing the axis of said drum, supported by said rods, and arranged by the reciprocation of the latter to be moved into and out of the vicinity of the drum.

5. In a land roller, the combination of a drum and a handle therefor; a pair of manually-operable rotatably connected disks mounted upon said handle; a pair of links eccentrically connected at one end to said disks, respectively, and extending in opposite directions; a pair of rods supported by said handle, connected to, and adapted to be reciprocated by, said links; and a scraper bar supported by said rods and arranged by the reciprocation of the latter to be moved into and out of the vicinity of the drum.

6. In a land roller, the combination of a drum and a handle therefor including a transverse member; a pair of manually-operable rotatably connected disks mounted upon said transverse member; a pair of links eccentrically connected at one end to said disks, respectively, and extending in opposite directions; a pair of rods; a pair of angle arms mounted upon said transverse member and connecting the other ends of said links and said rods, respectively, the latter being adapted to be reciprocated by said angle arms; and a scraper bar supported by said rods and arranged by the reciprocation of the latter to be moved into and out of the vicinity of the drum.

Signed by us, this 17th day of September, 1917.

RAY E. DUNHAM.
ARTHUR E. MERKEL.

Copies of this patent may be obtained for five cents each, by addressing the "Commissioner of Patents, Washington, D. C."